(12) United States Patent
Li

(10) Patent No.: US 8,314,811 B2
(45) Date of Patent: Nov. 20, 2012

(54) MIP-MAP FOR RENDERING OF AN ANISOTROPIC DATASET

(75) Inventor: Wei Li, Princeton, NJ (US)

(73) Assignee: Siemens Medical Solutions USA, inc., Malvern, PA (US)

( * ) Notice: Subject to any disclaimer, the term of this patent is extended or adjusted under 35 U.S.C. 154(b) by 1014 days.

(21) Appl. No.: 11/692,232

(22) Filed: Mar. 28, 2007

(65) Prior Publication Data

US 2007/0247473 A1  Oct. 25, 2007

Related U.S. Application Data

(60) Provisional application No. 60/786,577, filed on Mar. 28, 2006.

(51) Int. Cl.
*G09G 5/00* (2006.01)
*G06T 17/00* (2006.01)

(52) U.S. Cl. .......................... 345/587; 345/424
(58) Field of Classification Search ................... 345/587, 345/424
See application file for complete search history.

(56) References Cited

U.S. PATENT DOCUMENTS

| 6,236,405 | B1 * | 5/2001 | Schilling et al. | 345/582 |
| 6,593,925 | B1 * | 7/2003 | Hakura et al. | 345/426 |
| 7,525,551 | B1 * | 4/2009 | Newhall et al. | 345/587 |
| 2003/0128217 | A1 * | 7/2003 | Brokenshire et al. | 345/581 |
| 2004/0181151 | A1 | 9/2004 | Sumanaweera et al. | |
| 2005/0213837 | A1 | 9/2005 | Boykov et al. | |
| 2005/0260658 | A1 | 11/2005 | Paladini et al. | |
| 2005/0264578 | A1 | 12/2005 | Engel et al. | |
| 2006/0170681 | A1 * | 8/2006 | Ohba | 345/426 |
| 2007/0116332 | A1 * | 5/2007 | Cai et al. | 382/128 |

* cited by examiner

*Primary Examiner* — Aaron M Richer
(74) *Attorney, Agent, or Firm* — Donald B. Paschburg

(57) ABSTRACT

Mip-map construction is provided for three-dimensional rendering from an anisotropic dataset. One or more mip-map levels are generated by down sampling in the world space rather than texture space. The down sampling may be by an arbitrary scale factor rather than a power of two. For example, the voxels may be down sampled along one dimension by less than half (e.g., 16 to 12). The scale factors may be different along different dimensions. This non-uniform reduction in voxels may result in the mip-map being more isotropic than the anisotropic dataset.

17 Claims, 3 Drawing Sheets voxel

Pixel/voxel = 2, 0, 0   Pixel/voxel = 0, 1, 0   Pixel/voxel = 1.8, 0.5, 0

MIP-MAP FOR RENDERING OF AN ANISOTROPIC DATASET

RELATED APPLICATIONS

The present patent document claims the benefit of the filing date under 35 U.S.C. §119(e) of Provisional U.S. Patent Application Ser. No. 60/786,577, filed Mar. 28, 2006, which is hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present embodiments relate to mip-map construction for volume rendering, such as texture-based volume rendering. Mip-maps are created at different resolutions. A series of down-sampled volumes are created from an initial volume. For rendering, the map whose projections best match the screen resolution is used. The principle is to make one voxel project to approximately one pixel. This reduces aliasing artifacts and may also improve rendering speed.

For creating each mip-map, each dimension of a texture is down-sampled by a factor of two to create the next level of texture (e.g., 16×16×16 to 8×8×8). One type of mip-map is a rip-map where down sampling along one or more dimensions is by a greater amount than other dimensions, but still at a power of two (e.g., 16×16×16 to 8×8×4). Down sampling by a power of two facilitates the interpolation between adjacent mip-map levels for rendering. In texture-based volume rendering, it may be computationally expensive to involve more than one mip-map level in one rendering pass.

Some volume datasets are anisotropic. The voxel sizes and/or number of voxels along the three major axes are different. Each voxel and/or the volume may not be in the shape of cube. For example, the voxel size in Z is only ¼ of that in X or in Y, where X, Y, and Z are the major axes. Down sampling by a power of two may result in a similarly anisotropic mip-map level.

BRIEF SUMMARY

By way of introduction, the preferred embodiments described below include methods, systems, instructions, and computer readable media for mip-map construction or three-dimensional rendering from an anisotropic dataset. One or more mip-map levels are generated by down sampling in the world space rather than texture space. The down sampling may be by an arbitrary scale factor rather than a power of two. For example, the voxels may be down sampled along one dimension by less than half (e.g., 16 to 12). The scale factors may be different along different dimensions. This non-uniform reduction in voxels may result in the mip-map being more isotropic than the anisotropic dataset.

In a first aspect, a computer readable storage medium has stored therein data representing instructions executable by a programmed processor for mip-map processing of an anisotropic dataset. The storage medium includes instructions for reducing a number of voxels along at least one axis by a first factor other than a power of two.

In a second aspect, a method is provided for mip-map construction from an anisotropic dataset. The anisotropic dataset has voxels spaced along three major axes in world space. The voxels of the anisotropic dataset are down-sampled in world space along at least a first of the three major axes.

In a third aspect, a system is provided for three-dimensional rendering from an anisotropic dataset. A memory is operable to store the anisotropic dataset and at least a first mip-map generated from the anisotropic dataset. The first mip-map has a first number of voxels fewer than a dataset number of voxels along a first dimension. The first number is greater than one-half the dataset number. A processor is operable to volume render from the first mip-map or the anisotropic dataset.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

In volume rendering, mip-maps of a volume have different resolutions. The volume or mip-map level matching the current pixel/voxel ratio is selected for best performance and least aliasing. One or more mip-map levels may be generated with down sampling by a non-power of two scale factor. For an anisotropic dataset (e.g., medical imaging dataset), lower resolution volumes are created by down sampling in world space, rather than in volume/texture space. The scaling factors for the three major axes may be non-uniform. The down sampling in world space may result in mip-map volumes closer to isotropic. Non-uniform scaling with one or more arbitrary scale factors may allow optimization of the number of voxels. By adjusting the size of each down-sampled volume in a small range, the textures may be filled with useful voxels, rather than padding zeros. More freedom may be provided for choosing the size of each down-sampled texture to achieve the best performance and most efficient memory usage.

The scaling factors for each axis of each dataset are stored for choosing the mip-map level during rendering. Before rendering each image, pixel/voxel ratios are computed for the three major axes. The ratios are then compared with scaling factors of the mip-map volumes to choose a mip-map level.

Figure 1:
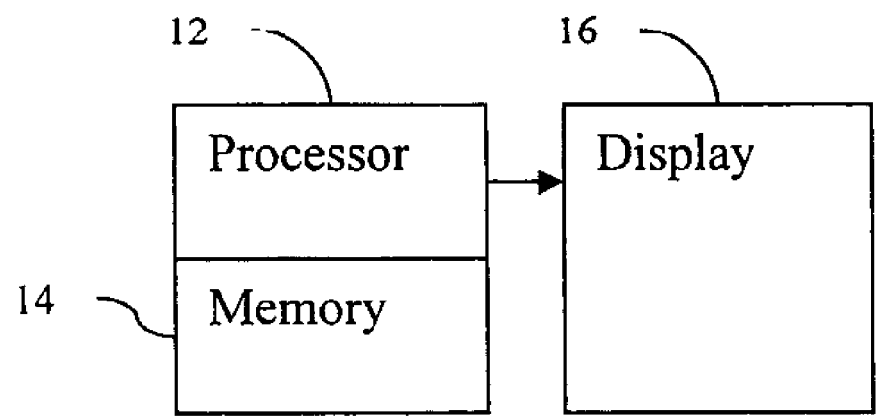
FIG. 1 is a block diagram of one embodiment of a system for volume rendering with a mip-map.

FIG. 1 shows a system for three-dimensional rendering from an anisotropic dataset. The system includes a processor 12, a memory 14, and a display 16. Additional, different, or fewer components may be provided. For example, a user input, network, or network connection are provided, such as for networking with a medical imaging network or data archival system.

The system is part of a medical imaging system, such as a diagnostic or therapy ultrasound, x-ray, computed tomography, magnetic resonance, positron emission, or other system. Alternatively, the system is part of an archival and/or image processing system, such as associated with a medical records database workstation. In other embodiments, the system is a personal computer, such as desktop or laptop, a workstation, a server, a network, or combinations thereof for rendering three-dimensional representations.

The processor 12 is a central processing unit, control processor, application specific integrated circuit, general processor, field programmable gate array, analog circuit, digital circuit, graphics processing unit, graphics chip, graphics accelerator, accelerator card, combinations thereof, or other now known or later developed device for constructing mip-map levels, controlling rendering, and/or rendering. The processor 12 is a single device or multiple devices operating in serial, parallel, or separately. The processor 12 may be a main processor of a computer, such as a laptop or desktop computer, may be a processor for handling some tasks in a larger system, such as in an imaging system, or may be a processor designed specifically for mip-map construction or rendering. In one embodiment, the processor 12 is a personal computer graphics accelerator card or components, such as manufactured by nVidia (e.g. Quadro4 900XGL or others), ATI (e.g. Radeon 9700 or others), or Matrox (e.g. Parhelia or others).

The processor 12 may be hardware devices for accelerating volume rendering processes, such as using application programming interfaces for three-dimensional texture mapping. Example APIs include OpenGL and DirectX, but other APIs may be used independent of or with the processor 12. The processor 12 is operable for volume rendering based on the API or an application controlling the API. The processor 12 is operable to texture map with alpha blending, minimum projection, maximum projection, surface rendering, or other volume rendering of the data.

The processor 12 creates mip-maps and corresponding information. The datasets are generated directly or indirectly from a same initial dataset. The mip-map levels corresponds to the different datasets with different resolution representing a same volume. For the mip-maps, a table or information about the plurality of datasets with different resolution is created or stored.

The processor 12 generates the datasets for the different mip-maps. An initial dataset is down-sampled one or more times. Decimation, filtering, decimation and filtering, or other reductions in the data may be used. For example, a volume kernel of the 8 nearest neighbors is used for filter based down sampling. Larger or smaller kernels with the same or different type of filtering may be used. A next smaller dataset is generated by down sampling from the initial dataset or from the previously down-sampled data set. The down sampling reduces the number of voxels along one, two, or three dimensions.

The processor 12 sets the scale factors for the down sampling. The scale factors for each major axis are the same or different than for other major axes. The major axes correspond to the format of the dataset. For a regularly spaced grid, the major axes are x, y, and z dimensions. For a polar coordinate format, the axes are azimuth, elevation, and range. The scale factors are predetermined, based on the number of voxels along one or more dimensions, based on the size of the dataset, based on the voxel size, based on the shape of the dataset, based on the shape of the voxels, combinations thereof, or other factors. In one embodiment, the scale factor for one axis is predetermined, and the scale factors for the other axes are a function of the predetermined scale factor and the voxel size along the axis for the scale factor being set.

The processor 12 selects the mip-map for rendering. The mip-map level to be rendered is selected as a function of the rendering parameters. For example, the amount of zoom and/or performance capabilities of the rendering are used to select the mip-map level for rendering. The total number of voxels, size of the voxels, size of the dataset, scale factors, pixel size, or combinations thereof may be used. For example, the size of a voxel relative to a pixel size is used for comparison with scale factors. A scale factor corresponding to or similar to the ratio of voxel size-to-pixel size indicates the mip-map to be used. The selected mip-map level may be the original dataset or a down-sampled dataset. The processor 12 renders from the selected dataset.

The memory 14 is a graphics processing memory, a video random access memory, a random access memory, AGP memory, random access memory, cache memory, hard drive, optical media, magnetic media, flash drive, buffer, or other memory device for storing data or video information. The memory 14 stores one or more datasets for rendering.

Any type of data may be used for volume rendering, such as medical image data (e.g., ultrasound, x-ray, computed tomography, magnetic resonance, or positron emission). The rendering is from data distributed in an evenly spaced three-dimensional grid, but may be from data in other formats (e.g., rendering from scan data free of conversion to a Cartesian coordinate format or scan data including data both in a Cartesian coordinate format and acquisition format). The data is associated with different volume locations in a volume, so is voxel data. The voxels are the same size and shape within the dataset. Voxels with different sizes, shapes, or numbers along a dimension may be included in a same dataset.

The dataset is isotropic or anisotropic. The dataset may include all cubic shaped voxels for an isotropic dataset. The size of voxels in each of three major axes is the same, so the dataset is isotropic. Anisotropic data is based on the shape of the voxels. The dataset includes non-cubic voxels for an anisotropic dataset.

The number of voxels in one or more of the three major axes is different than along another axis. The number of voxels along each of the three major axes may be the same.

The dataset is provided in real-time with acquisition. For example, the dataset is generated by medical imaging of a patient. The memory 14 stores the data temporarily for processing. Alternatively, the dataset is generated from memory, such as associated with rendering a virtual object or scene or from loading a previous scan of a patient.

After down sampling, one or more datasets are stored in the memory 14. The mip-map datasets are generated from the initial dataset, such as an anisotropic dataset. Down-sampling results in a fewer number of voxels along at least one dimension. The scale factor may be a power of two, such as having half, one-fourth, or one-eighth the number of voxels. The scale factor may be another value not a power of two, such as down sampling by less than half. The number of voxels in the lower resolution dataset along the dimension is greater than one-half the number in the previous or initial dataset. The reduction in number of voxels corresponds to a reduction in resolution.

The ratio of the number of voxels in the reduced resolution mip-map level to the number of voxels in the initial or previous dataset is the same or different for the different axes. For example, different ratios are provided to reduce the datasets non-uniformly. In one embodiment, the scale factors are interdependent. For example, one scale factor is set, and the other scale factors may depend on the set scale factor. Iterative setting or independent setting may be used.

Figure 2:
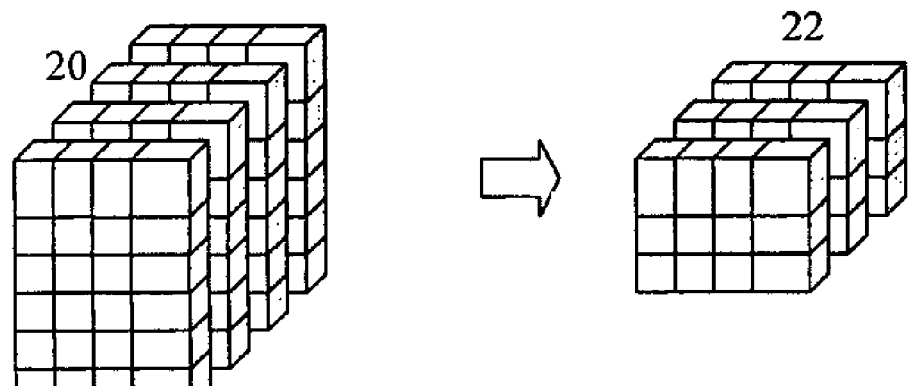
FIG. 2 is a graphical representation of construction of a mip-map level with down-sampling by a scale factor not at a power of two according to one embodiment.

Datasets for one or more mip-map levels is stored. For example, datasets with different resolutions may be generated. FIG. 2 shows an initial or previous data set 20 of 4×6×4 down-sampled to a dataset 22 of 4×3×3. In one embodiment, the number of voxels along each dimension is the same or less than for an immediately higher resolution dataset. In other embodiments, the resolution may be higher in one dimension, but lower in another dimension. The total number of voxels is the same, lower, or higher. The scale factors used for down sampling are the same or different for each mip-map level.

The memory 14 and/or another memory stores instructions for operating the processor 12. The instructions are for mip-map processing of an anisotropic dataset. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multi-processing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

Figure 3:
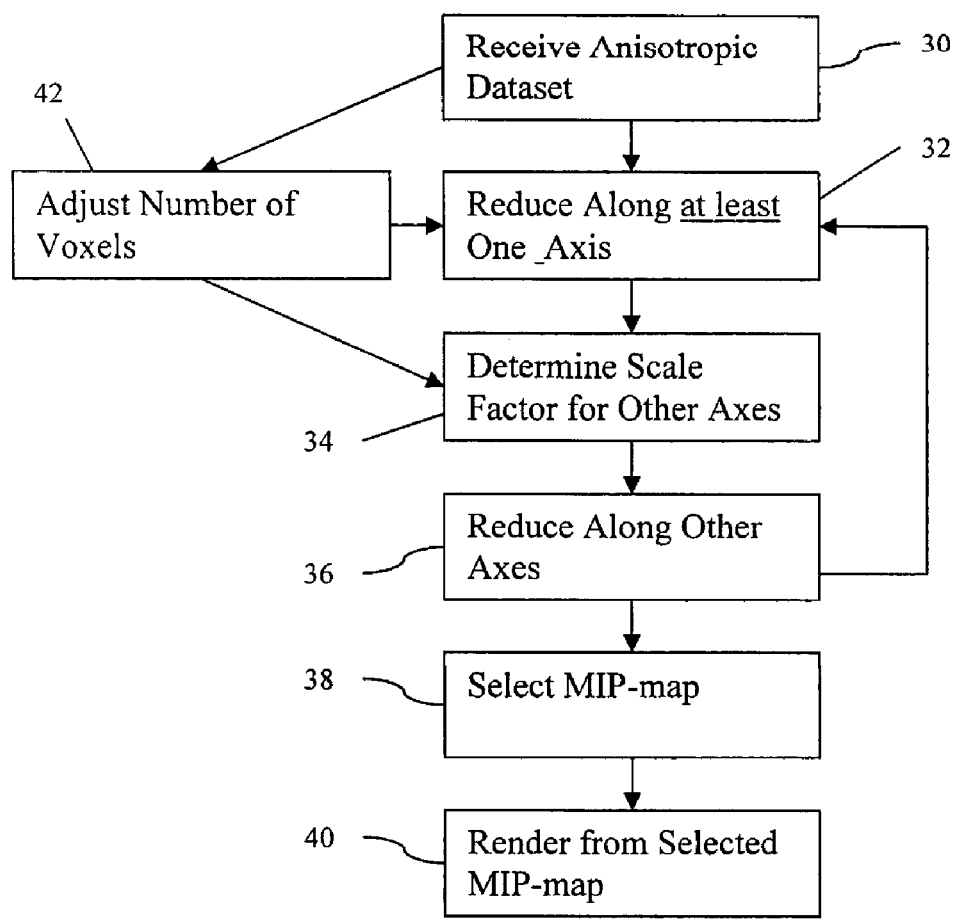
FIG. 3 is a flow chart diagram of one embodiment of a method for constructing a mip-map in world space and rendering from the constructed mip-map.

FIG. 3 shows a method for mip-map construction from an anisotropic dataset and rendering from the constructed mip-maps. The method is implemented by the system of FIG. 1 or another system. The method is performed in the order shown or other orders. For example, acts 32 and 36 are performed together or substantially simultaneously after act 34. Additional, different, or fewer acts may be provided, such as not providing act 42 or the feedback from acts 36 to 32.

In the method below, pseudo code (i.e., code illustrating the principle, but not necessarily resembling the real code—pseudo code may not compile or is executable on real system) examples are provided in C++ to illustrate the design and functionality of the mip-map construction and use in rendering. For operational code, specific programming for a particular system may be added. Other programming languages and/or hardware may be used. Other programs, software organization, approaches, or instructions may be used.

In act 30, the dataset for rendering is received. The dataset is received from a memory, from a scanner, or from a transfer. The dataset is isotropic or anisotropic. The voxels have any shape and size, such as being smaller along one dimension as compared to another dimension. The dataset has voxels spaced along three major axes in world space.

In act 32, the number of voxels along one axis is reduced. For example, down sampling is performed along a major axis of the dataset in the world domain. Any of the major axes may be selected for down sampling. The down sampling is applied in world space so that the lower resolution volume approaches isotropic. For example, the axis with the most number of voxels or with the smallest voxel dimension is selected.

Any scale factor may be used, such as a power of two. For example, N voxels along one major axis are down sampled by a factor of 2 or 4, providing N/2 or N/4 voxels. The power of two scale factor may be expressed as fraction, such as the factor of 2 being 0.5. The desired down-sampling factor scale is not necessarily 0.5. It can be any number in the range of (0, 1), or numbers outside this range.

In one embodiment, the scale factor is predetermined as 0.5 or other value. If the ratio maxVoxelSize/minVoxelSize of the current mip-map level is large, a smaller scaling factor, such as 0.3 or 0.25, may be used in order to reduce memory consumption of the down-sampled volume. The large as opposed to small may be determined based on the rendering speed required and the performance capability (e.g., available memory) of the system. In other embodiments, the scale factor is calculated as a function of the number of voxels, calculated as a function of the ratio of voxels along one dimension to along other dimensions, user selected, combinations thereof, or otherwise determined.

In act 34, the scale factors for other axes are determined. The scale factors may be determined in the same way as discussed above (e.g., predetermined or calculated as a function of voxel size). The scale factors are dependent or independent. In one embodiment, the scale factors for other axes are calculated as a function of the scale factor for the first axis and a voxel size along the other axis. For example, the scale factor for the X-axis is predetermined. The scale factor for the Y-axis is calculated as a function of the X-axis scale factor and the voxel size along the Y-axis. Other functions may be used. For example, the scale factor is calculated as a function of the other scale factor, a voxel size along the current major axis, and a minimum voxel size along any of the major axes.

One example embodiment is represented by the following pseudo code:

$$scaleArray[3] = \{\min(1, scale * voxelSize[0]/minVoxelSize),$$
$$\min(1, scale * voxelSize[1]/minVoxelSize),$$
$$\min(1, scale * voxelSize[2]/minVoxelSize)\};$$

where scale is the previously determined scale factor, such as a power of two scale factor 0.5. VoxelSize[0, 1, 2] are the voxel sizes for the three major axes. The minVoxelSize is the minimum voxel size along any axis. Any number in scaleArray is in the range of [scale, 1]. A high of 1 is used to avoid up sampling. Up sampling may be provided. ScaleArray[ ] contains the scaling factor of the dimensions of the volume in the current mip-map level. For subsequent mip-map levels, ScaleArray[ ] is calculated from the previous level.

It is possible that a volume is not down-sampled at all along one or two dimensions. In the example pseudo code above, the voxel aspect ratio may be too big or too small, resulting in no down sampling. For example, if a voxel shape is elongated, such as the ratio x/y is quite big, then reverse ratio y/x will be very small.

The scaling factors are stored and used for down sampling. For each mip-map level, including level 0, which is the original volume, three scaling factors are stored. For an isotropic dataset based on voxel size (e.g., cubic voxels), the scale factors are simply [1, 1, 1] for level 0, [0.5, 0.5, 5] for level 1, and so on using the example pseudo code above. In pseudo code, the storage of the scaling factors by mip-map level is represented as: mScales[MaxMipmapLevel][3]. The scaling factor of a mip-map level dimension is equal to the ratio of the number of voxels of the corresponding dimension versus that of the original volume. For example, for the $k^{th}$ level, mScales [k][i]=(voxels[i] of volume[k])/(voxels[i] of volume[0]) in this example. Other ratios or scale factor determinations may be used.

In act 36, the number of voxels along other axes is reduced. For example, the voxels of an anisotropic dataset are down-sampled in world space. The number of voxels is reduced by the appropriate scale factor along a major axis of the dataset. The scale factor may be other than a power of two. The reduction results in a mip-map level, dataset, and/or texture with less resolution. The $i^{th}$ dimension of the new volume is computed as newDimension[i]=scaleArray[i]*dimension[i] of the volume in the current level.

The down sampling of voxels along one axis may be by a less than one-half. For example, the starting number of voxels is N. After down sampling, the number of voxels is greater than N/2. By down sampling by less than one-half, more than one half of the voxels remain. A mip-map more isotropic than the previous mip-map or initial dataset may be generated. The dataset is non-uniformly reduced along the three major axes.

The reduction is performed by decimation, filtering, sampling, combinations thereof, or other techniques. In one embodiment, filtering is used. A boxcar or other volume-based kernel is applied to the data. For example, an 8 or 9 tap boxcar kernel is applied. For the cases where the scale factor is less than 0.5 or other value, a larger smoothing kernel may be used for down sampling so that the removed or replaced voxels more likely contribute to the low resolution volume.

The data format, resolution, or size for each spatial location is maintained. For example, intensity or grey scale data is down sampled without any transform. As another example, color and grey scale information may be down-sampled separately with the same or different scale factor. In alternative embodiments, the data is altered. For example, a transform is applied with data reduction. As another example, 12 or 16 bit data is quantized to 8 bits for down-sampled volumes.

In some embodiments, the voxels along one or more axes are maintained for a given mip-map level. The number of voxels along one or more axes is not reduced. For an anisotropic dataset, one dimension may not be down-sampled. If two levels of mip-map volumes have exactly the same number of voxels along one dimension, the scaling factors for that dimension in mip-map selection are not determined or used. A lower resolution volume may be used to achieve better rendering speed with same or similar image quality. For implementing the possibility of maintaining the resolution along an axis, the scale factor may be adjusted. Any adjustment function may be used. For example, the scale factors are calculated as discussed above for act 34 for different mip-map levels. For a given axis, the scale factors for adjacent mip-map levels are compared. The scale factor for one or both mip-map levels are adjusted based on the comparison. One embodiment is represented by:

If mScales[level][i] is close to mScales[level+1][i], then mScales[level][i]=infinity where close is any value, such as within 0.05 or 0.02. Resetting to infinity or other larger number may be used for influencing the mip-map selected for rendering.

The reduction acts 32 and 26, and determining scale factor act 34 are repeated. Each repetition creates another mip-map level. The previous iteration is used as the starting point for the next level. Alternatively, the initial dataset is used for each iteration, but the scale factors are set to provide levels with different resolution. The repetition is actual or virtual, such as determining scale factors for each level before repeating or creating the datasets for the levels. Any number of repetitions may be used, such as none, one, two, or more. In one embodiment, a set number of repetitions are performed (e.g., 2, 3 or 4). In other embodiments, creating mip-map levels continues until a triggering event occurs. Any triggering event may be used, such as the resolution, number of voxels, voxel size or other characteristic reaching a threshold.

Table 1 below shows one example embodiment of four mip-maps. Mip-map 0 is the initial data set and columns 1, 2 and 3 represent three additional mip-maps with different levels of resolution. In this case, the data set is anisotropic based on voxel size.

TABLE 1

|  |   | 0 | 1 | 2 | 3 |
|---|---|---|---|---|---|
|  | X | 512 | 512 | 490 | 245 |
|  | Y | 512 | 512 | 490 | 245 |
|  | Z | 3400 | 1700 | 850 | 425 |
|  | xSize | 0.765625 | 0.765625 | 0.8 | 1.6 |
|  | ySize | 0.765625 | 0.765625 | 0.8 | 1.6 |
|  | zSize | 0.200000 | 0.400000 | 0.8 | 1.6 |
| Unadjusted scale factor | x | 1 | 1 | 0.96 | 0.48 |
|  | y | 1 | 1 | 0.96 | 0.48 |
|  | z | 1 | 0.5 | 0.25 | 0.125 |
| Adjusted scale factor | x | infinity | infinity | 0.96 | 0.48 |
|  | y | infinity | infinity | 0.96 | 0.48 |
|  | z | 1 | 0.5 | 0.25 | 0.125 |

Rows labeled X, Y, and Z show the number of voxels along the three axes. The original volume is 512×512×3400. Rows xSize, ySize, and zSize show the voxel sizes along the X, Y, and Z-axes.

For level 1, only the Z dimension is down-sampled by a factor 2. For level 2, the Z dimension is scaled by 0.5 again, while X, and Y are just slightly reduced based on the pseudo codes example above for calculating scale factors. The dataset in level 2 is isotropic based on voxel size with a voxel size of 0.8 for all the three dimensions. For level 3, the down sampling is applied for the three axes uniformly. The last six rows show the scale factors before and after adjustment using the embodiment shown in pseudo code above. Note that the adjusted scale factors in levels 0 and 1 for both x and y are infinity. In other words, only the z-scaling factor is used to choose among levels 0 and 1 for selecting mip-maps.

Rendering is performed using the constructed mip-maps. Acts 38 and 40 are performed for rendering.

In act 38, a mip-map is selected for rendering. The mip-map is selected as a dataset, texture, or other representation. The different datasets for the different mip-map levels are associated with different resolutions. The dataset for rendering is selected based on the desired resolution. In one embodiment, the scale factors for one or more axes are used to select the mip-map level. For example, the selection is a function of the scale factors along each axis, and a voxel size relative to a pixel size. A pixel-to-voxel size ratio for a given view direction and zoom is compared with the axial scale factors for each mip-map of the group of mip-maps.

Figure 4:
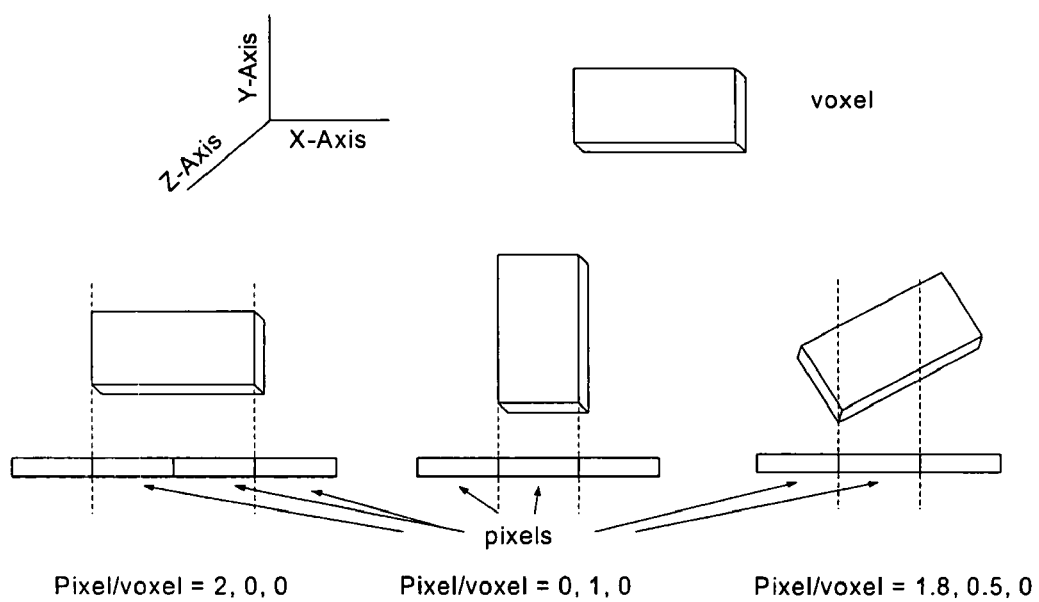
FIG. 4 is a graphical representation of one example of selecting a mip-map level for rendering.

In one embodiment, before rendering each frame of image, the unit vectors in volume space along each major axis are projected individually. Three pixel/voxel ratios (X, Y, and Z) are obtained. FIG. 4 shows an example. A voxel size and shape are shown relative to the three major axes in the top of the figure. Three example view directions (dashed lines) are shown in the bottom of the figure. For example, even if neither the zooming factor nor the image size is changed, rotating the volume results in different pixel/voxel ratios. In the right view, the view direction is along a short side and perpendicular to a long side of the voxels. In the middle view, the view direction is along a long side and perpendicular to the short side of the voxels. In the left view, the view direction is at a non-right angle to the voxels. The ratio of the pixel width to the voxel is view-dependent. The pixel/voxel ratios in X, Y, and Z are shown below each view. For an anisotropic dataset, the unit vectors have different lengths in world space. The lengths in pixels of each projected unit vectors are the three pixel/voxel ratios. The larger ratios indicate that a higher resolution of volume is desired for rendering.

By comparing the pixel/voxel ratio with those scaling factors associated with the mip-map volumes, the mip-map level to be used for rendering is identified. For example, the pixel/voxel ratios of FIG. 4 are compared to the adjusted scaling factors of the mip-map volumes in the example of Table 1 above. The comparison starts with the volume with the highest resolution (e.g., mip-map level 0). If any of the three ratios is greater than the corresponding scaling factor, then that level is chosen. Otherwise, the next level is tested in order of decreasing resolution. If no level of mip-map satisfies this requirement, the highest level (lowest resolution) or other level of resolution is selected. For example using Table 1 above and the left view example of FIG. 4, 1.8 is less than infinity, 0.5 is less than infinity, and 0.0 is less than 1. Level 0 is not selected. Level 1 is not selected since 0.0 is less than 0.5. Level 2 is selected since 1.8 is greater than 0.96.

The selection may be represented by the following pseudo code:

```
t = 0.7f;
t1 = max(0, 1 - t);
selectedLevel = -1;
for( i = 0; i < MipMapLevels -1; i++)
{
    if(pvRatio[0] > (mScales[i][0] * t1 + mScales[i+1][0] * t) ||
       pvRatio[1] > (mScales[i][1] * t1 + mScales[i+1][1] * t) ||
       pvRatio[2] > (mScales[i][2] * t1+ mScales[i+1][2] * t))
    {
        selectedLevel = i;
        break;
    }
}
// Not found in the previous loop, use the highest
if(selectedLevel < 0)
            selectedLevel = MipMapLevels -1;
``` where t is a blending factor usually between 0 and 1. t can adjusted for different quality requirements. Larger t corresponds to better image quality. In extreme cases, t is set greater than one and t1=0. Other selection criteria or implementations may be used.

In another embodiment, more than one level is selected. Adjacent levels may be selected for interpolation. An interpolation factor is determined, such as based on the ratio of voxel size to pixel size or the pixel/voxel ratio to scale factor. The selected datasets are used to interpolate as function of the interpolation factor. The interpolation factor may be adjusted to decide which level to choose when the pixel/voxel ratio falls in between the scaling factors of two adjacent levels.

The selected dataset or interpolated dataset is rendered in act 40. For example, the rendering is performed from the selected mip-map texture. Volume rendering is performed with the dataset. Since the selected dataset has a desired resolution, the rendering may be more rapid. The rendering application is an API, other application operating with an API, or other application for rendering.

Any now known or later developed volume rendering may be used. For example, projection or surface rendering is used. In projection rendering, alpha blending, average, minimum, maximum, or other functions may provide data for the rendered image along each of a plurality of ray lines or projections through the volume. Different parameters may be used for rendering. For example, the view direction determines the perspective relative to the volume for rendering. Diverging or parallel ray lines may be used for projection. The transfer function for converting luminance or other data into display values may vary depending on the type or desired qualities of the rendering. Masking and/or clipping may determine data to be used for rendering. Segmentation may determine a portion of the volume to be rendered. Opacity settings may determine the relative contribution of data. Other rendering parameters, such as shading or light sourcing, may alter relative contribution of one datum to other data. The rendering uses the data representing a three-dimensional volume to generate a two-dimensional representation of the volume.

In act 42, the number of voxels may be adjusted for other reasons than mip mapping. For example, the mip-map construction is used with bricking. To allow rendering from datasets larger than the hardware is capable of dealing with in a single pass, the dataset may be divided into bricks. Mip-maps are constructed for each brick. To avoid boundary artifacts, the number of voxels in a given brick and associated mip-maps may be adjusted as a function of the brick size. For example, a large volume is broken into smaller bricks, and each brick corresponds to a texture. To utilize the texture memory most efficiently, the mip-map volume sizes are adjusted slightly. One or more levels may not be adjusted, such as the initial brick or dataset. The adjustment is made so that texels correspond to meaningful voxels. Adjacent bricks have certain overlap to ensure proper interpolation.

The adjustment includes two steps. First, a dimension is enlarged if necessary so that the dimension is a multiple of the corresponding brick dimension. Assuming the number of voxels in one dimension of a volume is 200, and the brick size along the same axis is 64, the number of voxels is expanded to 256 (i.e., 4×64). Actual up sampling is not performed, but may be. The expansion is for later actual down sampling of the dataset. In the second step, the number of voxels in the dimension is reduced to accommodate overlap between neighboring bricks. Assuming the overlap between bricks is 3 voxels, the number of voxels is reduced to 247 in this example (e.g., 256−overlap*(number of bricks along the axis−1) =256−3*(4−1). Other overlaps may be used. The adjustment is performed before the down sampling. The dataset is then down-sampled to the adjusted dimensions.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. In a non-transitory computer readable storage medium having stored therein data representing instructions executable by a programmed processor for MIP-map processing of an anisotropic dataset to initially construct a set of MIP-maps at different resolutions, the storage medium comprising instructions for:

reducing, as part of originally creating the set of the MIP-maps to be stored, a number of voxels along at least one axis by a first factor other than a power of two, wherein the one axis comprises a first major axis relative to the anisotropic dataset;

making the created, stored MIP-maps available for use after the creation, reducing along at least a second major axis relative to the anisotropic data set by a second factor of a power of two; and calculating the first factor as a function of the second factor, a voxel size along the first major axis, and a minimum voxel size along the first, second and a third major axes.

2. The computer readable storage medium of claim 1 wherein the reducing is associated with generating a first MIP-map texture at a first resolution;

further comprising:
selecting the first MIP-map texture at the first resolution from a group of MIP-map textures at different resolutions; and
rendering from the first MIP-map texture.

3. The computer readable storage medium of claim 2 wherein selecting comprises selecting as a function of a comparison of a pixel-to-voxel size ratio along a dimension with an axial scale factor for each MIP-map texture of the group of MIP-map textures.

4. The computer readable storage medium of claim 1 wherein reducing comprises making the anisotropic dataset more isotropic.

5. The computer readable storage medium of claim 1 wherein reducing comprises non-uniformly reducing along the first, second and third major axes.

6. The computer readable storage medium of claim 1 wherein reducing comprises down sampling by less than one-half.

7. The computer readable storage medium of claim 1 wherein the reducing is associated with generating a first MIP-map level at a first resolution;

further comprising:
repeating the reducing for at least one additional MIP-map level.

8. The computer readable storage medium of claim 1 wherein the reducing is associated with generating a first MIP-map level at a first resolution;

further comprising:
maintaining at least the third major axis free of reduction for the first MIP-map level.

9. The computer readable storage medium of claim 1 wherein the reducing is associated with generating a first MIP-map level at a first resolution;

further comprising:
adjusting the number as a function of a brick size.

10. A method for MIP-map construction from an anisotropic dataset, the method comprising:
receiving the anisotropic dataset having voxels spaced along three major axes in world space;
down sampling, with a processor, the voxels of the anisotropic dataset in world space along at least a first of the three major axes by a first scale factor other than a power of two; and calculating the first scale factor as a function of a second scale factor that is a power of two.

11. The method of claim 10 wherein the down sampling comprises generating a first MIP-map at a first resolution as a function of the first scale factor;

further comprising:
down sampling the first MIP-map or the anisotropic dataset to a second resolution for a second MIP-map as a function of a third scale factor, the second resolution different than the first resolution;
selecting one of the first or second MIP-maps, the selecting being a function of the first and third scale factors and a voxel size along at least one of the three major axes relative to a pixel size along the at least one of the three major axes; and
rendering from the selected MIP-map.

12. The method of claim 10 wherein down sampling comprises non-uniformly reducing along the three major axes, the first MIP-map being more isotropic than the anisotropic dataset.

13. The method of claim 10 wherein down sampling comprises down-sampling voxels along the first axis by a less than one-half.

14. The method of claim 10 wherein down sampling comprises:
down-sampling along the first major axis by the second scale factor of a power of two; and
down-sampling along a second of the three major axes by the first scale factor other than a power of two.

15. A system for three-dimensional rendering from an anisotropic dataset, the system comprising:
a memory operable to store the anisotropic dataset and at least a first MIP-map originally generated from the anisotropic dataset, the first MIP-map having a first number of voxels fewer than a dataset number of voxels along a first dimension, the first number being greater than one-half the dataset number, wherein the greater than one-half is a first scale factor, the first MIP-map having a second scale factor along a second dimension, the second scale factor being a power of two; and
a processor operable to volume render from the first MIP-map or the anisotropic dataset, wherein the processor is operable to set the first scale factor as a function of the second scale factor and a voxel size.

16. The system of claim 15 wherein the first MIP-map has a first resolution as a function of the first scale factor, wherein the memory is operable to store a second MIP-map having a second number of voxels fewer than the first number along the first dimension, the second MIP-map having a second resolution as a function of a second scale factor;
wherein the processor is operable to select the first MIP-map as a function of the first and second scale factors and the voxel size along the first dimension relative to a pixel size along the first dimension, and wherein the processor is operable to volume render from the selected first MIP-map.

17. The system of claim 15 wherein the first MIP-map comprises different ratios of voxels along the first dimension, a second dimension, and a third dimension to voxels of the anisotropic dataset along the first, second and third dimensions, respectively.

* * * * *